United States Patent
Krumpholz

(10) Patent No.: US 11,763,983 B2
(45) Date of Patent: Sep. 19, 2023

(54) CURRENT DEPENDENT INDUCTIVITY

(71) Applicant: Delta Electronics (Thailand) Public Co., Ltd., Samutprakarn (TH)

(72) Inventor: Christian Krumpholz, Freiburg (DE)

(73) Assignee: DELTA ELECTRONICS (THAILAND) PCL., Samutprakarn (TH)

(*) Notice: Subject to any disclaimer, the term of this patent is extended or adjusted under 35 U.S.C. 154(b) by 236 days.

(21) Appl. No.: 17/107,044

(22) Filed: Nov. 30, 2020

(65) Prior Publication Data
US 2021/0166867 A1 Jun. 3, 2021

(30) Foreign Application Priority Data
Nov. 29, 2019 (EP) .................... 19212679

(51) Int. Cl.
| | |
|---|---|
| H01F 27/42 | (2006.01) |
| H01F 3/14 | (2006.01) |
| H01F 27/38 | (2006.01) |
| H02M 1/15 | (2006.01) |

(52) U.S. Cl.
CPC ............. *H01F 27/427* (2013.01); *H01F 3/14* (2013.01); *H01F 27/385* (2013.01); *H02M 1/15* (2013.01)

(58) Field of Classification Search
CPC ........... H01F 3/14; H01F 27/427; H01F 27/24
See application file for complete search history.

(56) References Cited

U.S. PATENT DOCUMENTS

| | | | | |
|---|---|---|---|---|
| 2003/0227363 A1* | 12/2003 | Leisten | ..................... | H01F 3/14 336/178 |
| 2005/0012586 A1* | 1/2005 | Sutardja | .................. | H01F 37/00 336/200 |
| 2011/0304419 A1* | 12/2011 | Dal Re | .................... | H01F 38/12 335/297 |
| 2014/0313002 A1 | 10/2014 | Kuo et al. | | |
| 2015/0069853 A1* | 3/2015 | Wang | ...................... | H02M 1/14 307/104 |

FOREIGN PATENT DOCUMENTS

| | | |
|---|---|---|
| DE | 941 806 C | 4/1956 |
| DE | 36 22 190 A1 | 1/1988 |
| EP | 0 012 629 A1 | 6/1980 |
| WO | 97/02583 A1 | 1/1997 |

OTHER PUBLICATIONS

European Search Report dated May 12, 2020, 9 pages.

* cited by examiner

*Primary Examiner* — Adolf D Berhane
*Assistant Examiner* — Afework S Demisse
(74) *Attorney, Agent, or Firm* — Vector IP Law Group; Robert S. Babayi

(57) ABSTRACT

A passive, current dependent inductivity (1) comprises a magnetic core (2), windings (3) and at least one bank air gap (4). A saturation region (5) made of magnetic material is arranged between the bank air gap (4) and the windings (3). A magnetic flux path (6) bifurcates into a first path (61) passing through the saturation region (5) and into a second path (62) passing through the bank air gap (4) and bypassing the saturation region (5). The magnetic resistance of the first path (61) is lower than the magnetic resistance of the second path (62) for winding currents below a first saturation current (7a) and whereby the magnetic resistance of the second path (62) is lower than the magnetic resistance of the first path (61) for winding currents above the first saturation current (7a) due to saturation of the saturation region.

14 Claims, 3 Drawing Sheets

CURRENT DEPENDENT INDUCTIVITY

TECHNICAL FIELD

The invention relates to a passive, current dependent inductivity and to a method for constructing such a passive, current dependent inductivity. Finally, the invention relates to a power converter comprising the passive, current dependent inductivity.

BACKGROUND ART

A well-known solution for constructing passive, current dependent inductivities is to use a magnetic core with a central leg surrounded by windings. The central leg of this prior art solution comprises a stepped air gap. The stepped air gap is for example constructed by removing the central leg completely in a short, first region and by reducing the cross-section of the central leg in a second region adjacent to the first region. Thereby, while low currents are flowing through the windings, there is only a small magnetic flux created and only the first region acts as air gap and determines the value of the inductivity. With increasing current flowing through the windings, the magnetic flux increases, up to the point where the second region of the central leg saturates and its permeability drops. This results in an increased resistance for the magnetic flux. Effectively, the second region behaves in this situation as an air gap. Consequently, the value of the inductivity decreases.

This solution has however some draw-backs: The magnetic field fringes at the air gaps. The first region is in most cases sufficiently small to keep the losses due to interaction of the magnetic field with the windings acceptable even in a compact arrangement of the windings. This ceases to be the case once the saturation effect occurs: The newly appearing air gap has the size of the first and the second region together. The fringing magnetic field reaches out much further away from the central leg and one has either to accept high losses or the distance between windings and central leg has to be increased. Building a compact inductivity with low losses even at higher currents is not possible with this prior art solution.

Another solution for a passive, current dependent inductivity is disclosed in the US 2014 0 313 002 (Delta). This application discloses an assembly of five I-cores which are arranged to an E-I-core. Windings surround the central leg while the two outer legs, arranged in parallel to and on different sides of the central leg have different lengths. This results in air gaps of different sizes on the right and on the left of the central leg. While a low current is flowing through the windings, the magnetic resistance of the path through the longer leg is lower than the magnetic resistance of the path through the shorter leg. The total inductivity has therefore a first value. If the current increases, a point will be reached where the longer leg saturates, increasing the resistance of this path and thereby guiding the magnetic field to use the path through the shorter leg, too. This is turn causes the value of the total inductivity to drop.

While large air gaps are avoided, the solution of the US '002 is on one hand restricted to very specific core geometries and on the other hand, all of its air gaps are in the immediate vicinity of the windings. The fringing field can again interact with the windings and cause losses if the inductivity is built in a compact way.

Besides passive, current dependent inductivities, active current dependent inductivities are also know. Active current dependent inductivities comprise a control circuit. This control circuit can either create an additional magnetic current in the core or control the size of the air gap mechanically. While offering a great flexibility in adapting the inductivity, such active components need additional circuitry and are more complex to build and have consequently a greater risk of failure and higher costs.

SUMMARY OF THE INVENTION

It is the object of the invention to create a passive current depending inductivity pertaining to the technical field initially mentioned, that allows to minimize losses while being compact in size.

The solution of the invention is specified by the features of claim 1. According to the invention a passive, current dependent inductivity comprises a magnetic core, windings and at least one bank air gap. A saturation region made of magnetic material is arranged between the bank air gap and the windings. The saturation region is arranged such that a magnetic flux path bifurcates into a first path passing through the saturation region and into a second path passing through the bank air gap and bypassing the saturation region. The magnetic resistance of the first path is lower than the magnetic resistance of the second path for winding currents below a first saturation current and whereby the magnetic resistance of the second path is lower than the magnetic resistance of the first path for winding currents above the first saturation current due to significant saturation effects occurring in the saturation region.

A magnetic material is preferably a material with an initial, relative permeability of greater than 2. A non-magnetic material is a material with an initial, relative permeability of less than 2.

The initial permeability is the permeability measured at unmagnetized materials at magnetic field strength close to zero. It is the slope of the initial magnetization curve of the B-H loop at the origin. Preferably, the initial permeability is determined at 25° C.

A relative permeability is the permeability divided by the permeability of free space $\mu_0$.

The initial, relative permeability is therefore the slope of the initial magnetization curve of the B-H loop at the origin divided by the permeability of free space $\mu_0$.

Placing the saturation region between the bank air gap and the winding increases the efficiency of the inductivity: The saturation region acts in this case as a barrier between the windings and the bank air gap. The fringing magnetic field in the bank air gap interacts with the saturation region instead of the windings: Even if the saturation region is saturated and has a high magnetic resistance, this resistance is still at least slightly lower than the magnetic resistance of the surrounding air resulting is a guidance of the fringing magnetic field.

The bank air gap is an air gap with a similar purpose as a bank to a river: It prevents most of the magnetic flux from not entering the saturation region as long as it is not saturated. Once the saturation region saturates, a significant fraction of the magnetic flux crosses the bank air gap and is guided by the magnetic core part arranged in parallel to the saturation region.

The magnetic flux is the magnetic flux created by a current flowing through the winding of the inductivity.

The situation is described with the terms commonly used to describe a magnetic circuit: A magnetic field is created when a current flows through the windings. This magnetic field creates a magnetomotive force which "drives" the magnetic flux through the magnetic circuit. Magnetic flux always forms closed loops. The position and shape of these loops depends strongly on the magnetic resistance of the surrounding materials: The loops choose the path of the least resistance. The magnetic resistance, sometimes also called reluctance, is defined as the ratio of the magnetomotive force and the magnetic flux. In a magnetically uniform magnetic circuit element, the magnetic resistance can be calculated by the length of the element divided by the product of the permeability of the material and the cross-sectional area of the element. If not otherwise noted, this document assumes that the magnetic resistance is the magnetic resistance determined at a small and initial magnetic flux and therefore without saturation and/or hysteresis effects.

Further, in the context of the invention, a magnetic flux path should preferably be any loop which follows for most of its length the magnetic core for a given magnetic core and winding geometry. The magnetic resistance of magnetic flux paths according to this invention is preferably significantly lower than the magnetic resistance of loops which are no flux paths for magnetic fluxes low enough to avoid saturation effects everywhere in the magnetic core. In one preferred embodiment and in order to determine which loops are considered to be magnetic flux paths, the magnetic resistance of all possible paths at a low magnetic field is determined resulting in most cases in a bimodal distribution of values. All loops belonging to the group with the lower resistance are considered to be magnetic flux paths. In the case that there is no bimodal distribution the mid-range is preferably used as threshold with all loops having a magnetic resistance lower than the mid-range being considered to be magnetic flux paths.

In the context of the invention, a bifurcating magnetic flux path should be understood as two loops, both being magnetic flux paths, which have a common position and shape in one region but differ from each other in a second region.

The saturation region is preferably a part of the magnetic core with a cross-section perpendicular to the magnetic flux path passing through it which is smaller than the cross-sections perpendicular to the same magnetic flux in another region of the magnetic core associated with the same flux path. In another embodiment, the saturation region is made of a material which saturates at a magnetic flux at which the material of the rest of the core does not saturate.

Preferably, the saturation region is arranged between the bank air gap and the windings if all straight lines connecting a point of the bank air gap with a point of the windings cross the saturation region.

Preferably, an air gap, especially the bank air gap, is a region crossed by a magnetic flux path which is made of a material with a lower initial relative permeability compared to the materials crossed by the magnetic flux path immediately before and behind it. Preferably, the cross-section of the air gap, especially the bank air gap, perpendicular to the magnetic flux path, equals the smaller one to the cross-sections, measured perpendicular to the magnetic flux path, of the materials crossed by the magnetic flux path immediately before and behind the air gap.

The bank air gap is an air gap.

"Significant saturation effects" start to occur preferably at the magnetic field strength H at which there is the maximum of the curve of the amplitude permeability on the y-axis and the applied magnetic field strength H on the x-axis. Preferably, the beginning of significant saturation effects is determined at an estimated working temperature of the passive, current dependent inductivity. In another embodiment, the beginning of significant saturation effects is determined once at 25° C. and once at 100° C. and the beginning of significant saturation effects is assumed to happen at the arithmetic average of the applied magnetic field strength H values of these two measurements.

In one embodiment, the saturation region is made of a material with a sharp saturation behaviour.

Preferably, a material has a sharp saturation behaviour, if the curve showing the incremental permeability on the vertical axis and the magnetic field strength H on the x-Axis is approximated by a power law and the observed exponent of this power law is smaller or equal to −1, preferably less or equal to −1.5. Preferably a material has a soft saturation behaviour if the observed exponent of the power law is greater than −1. Preferably, the necessary measurements are done at a temperature of 25° C.

To determine the exponent, preferably, the magnetic field strength is determined at which the incremental permeability reaches 70% and 30% of the incremental permeability at a low magnetic field strength. The exponent of the power law can be estimated to be the logarithm of the ratio of the two incremental permeabilities divided by the logarithm of the ratio of the two magnetic field strength values. The magnetic resistance of materials with a sharp saturation behaviour increases strongly with increasing magnetic field strength once the saturation started. The inductance of a current dependent inductivity changes therefore clearly and fast in the reaction of magnetic field strength values in a small magnetic field strength interval, beginning at the saturation magnetic field strength. The characterizing curve of the inductivity according to the invention, showing the inductance in dependence of the current flowing through the winding, comprises therefore clearly separated plateaus of nearly constant inductance over intervals of current values. Essentially and in practice a passive, current dependent inductivity with a saturation region made of material with a sharp saturation behaviour can be described as having a set of discrete inductance values. This facilitates the design of circuits which use the inductance at hand and it also helps to detect that a current significantly greater than a first saturation current flows through the winding.

It is also possible to make the saturation region from a material made of soft saturating material. In this case the inductance changes over wider intervals of winding currents but the changes are smaller compared to the case of a material with a sharp saturating behaviour.

In one preferred embodiment, the saturation region is made of material with a sharp saturation behaviour while other parts of the magnetic core are made of material with a soft saturation behaviour. In this way, the inductivity can have a clearly distinguished initial and intermediate inductance but a smooth transition to the low values which are reached once the magnetic core is completely saturated.

In a preferred embodiment, the saturation region is made of ferrite.

In a more preferred embodiment, the saturation region is made of soft ferrite.

Preferably, a ferrite is here and in the following a material resulting of a process where iron oxide and further metallic compounds are mixed in power form, calcined, afterwards milled to small particles, pressed into shape and sintered.

A soft ferrite is a ferrite with a low coercivity. For example Manganese-zinc ferrite and Nickel-zinc ferrite are soft ferrite.

Ferrite have the advantage that they have a high electric resistivity which reduces eddy current losses in the material at high frequencies. Therefore the use of a ferrite makes the inductivity even more efficient. Further, they have typically an initial relative permeability of 15 or more, resulting in an efficient guiding of the magnetic field and the resulting flux while being unsaturated. Preferably, a ferrite with an initial relative permeability of greater than 1000 is used. Many ferrites saturate sharply. This results in a precise transition between the winding current interval during which the inductance of inductivity is dominated by the first path and the winding current interval during which the inductance of the inductivity is dominated by the second path.

In another embodiment, the saturation region is made of a powder core. The powder core saturates softy. Therefore, the inductance of a powder core drops slower with increasing magnetic field strength H and over a wider range of magnetic field strength values than a comparable ferrite core. This results in a smooth transition between the winding current interval during which the inductance of inductivity is dominated by the first path and the winding current interval during which the inductance of the inductivity is dominated by the second path.

In another embodiment, the saturation region is made of amorphous metals. Cores made of amorphous metal saturates softy, and therefore their inductance drops slower with increasing magnetic field strength and over a wider range of magnetic field strength values than a comparable ferrite core. This results in a smooth transition between the winding current interval during which the inductance of inductivity is dominated by the first path and the winding current interval during which the inductance of the inductivity is dominated by the second path.

In one embodiment, all parts of the magnetic core which are not air gaps are made of the same material, preferably ferrite.

As the saturation region is a part of the magnetic core, there is in this embodiment no difference in the material between the saturation region and the rest of the magnetic core other than the air gaps.

Air gaps are for example the bank air gap and the central air gap if applicable.

This has the advantage that the design and manufacturing is simplified, as only a minimum of materials has to be considered and combined with each other.

In one embodiment the saturation region is adjacent to the windings.

It is the basic idea of the invention to place the saturation region in between the bank air gap and the windings. In addition to this requirement, this embodiment requires the absence of any further components between the saturation region and the windings. Preferably, however, the windings comprise a coil former.

This has the advantage that the inductivity is more compact as the saturation region itself is used to define the winding window.

In one embodiment, the bank air gap is completely surrounded by magnetic material.

A magnetic flux crossing an air gap fringes. This means that a volume outside of the convex hull of the magnetic core could be crossed by the magnetic flux. In order to avoid undesired influences on components arranged close to the inductivity, the bank air gap can be surrounded with magnetic material. In this case, the fringing magnetic field of the bank air gap is concentrated inside the core by the surrounding magnetic material before a significant amount can extend out of the core.

In one embodiment, the bank air gap ends at the outer walls of the magnetic core. This embodiment has the advantage that it is easy to construct: The bank air gap can simply be constructed by placing a layer of a desired thickness between two magnetic cores.

In one embodiment, the bank air gap comprises regions of different thickness. Preferably the bank air gap is filled with two different non-magnetic materials, especially partially with a fluid such as air and partially with a solid non-magnetic material.

This has the advantage that regions where the magnetic flux is supposed to cross the air gap once significant saturation effects occur in the saturation region can be distinguished from regions the magnetic flux should not cross the air gap as a greater thickness increases the magnetic resistance. Further, this embodiment allows to guide the magnetic flow in the second path more precisely. Finally, this embodiment allows to construct the part of the magnetic core which defines the second path from the same components as the rest of the magnetic core. This reduces costs.

The used of solid non-magnetic material has the advantage that the bank air gap thickness can be fixed by simply placing a non-magnetic material of the desired thickness in between the core material. The use of air or another fluid as non-magnetic material facilitates cooling and the construction in the case of complicates shapes of the core material surrounding the bank air gap.

In another embodiment, the band air gap has a constant thickness. In this case the part of the magnetic core which defines the second path can be a simple flat plate or a plate with an elevated rim. Both shapes are easy to construct. Further, simulations and calculations are facilitates do to the simple geometry.

In one embodiment all windings are wound around the same leg of the magnetic core.

Winding all windings around the same leg facilitates the design of the inductivity and allows in most cases to build it more compact.

In one embodiment, the bank air gap extends perpendicular to a longitudinal axis of the winding and crosses the longitudinal axis of the windings above or below the windings.

In this embodiment, the saturation region is located at directly above the upper or directly below the lower end of the winding window. Possible fringing fluxes appearing the in saturation region, the bank air gap or structures close to it, can only, if at all, interact with the upper or lower end of the windings. A heating caused by the interaction of a magnetic field with the conducting winding happens therefore, if at all, only in this rather small and peripheral region where passive cooling is in many cases sufficient.

In one embodiment, the current dependent inductivity comprises a central air gap which is located on the leg of the magnetic core around which the windings are wound.

The central air gap is an air gap. It is different from the bank air gap. The central air gap is used to control the total inductance of the inductivity at low winding currents and therefore in situations where the saturation region is not saturated. The size of the central air gap is preferably chosen small enough to avoid significant losses. Placing the central air gap on the leg of the magnetic core around which the windings are wound is on the one hand a universal solution which can be adapted to many different types and geometries of cores and on the other hand, it creates a symmetric shape of the inductivity which is easier to design and to handle compared to asymmetric shapes.

In one embodiment, the current dependent inductivity comprises one or more lateral air gaps in all or some of the lateral parts of the magnetic core. Lateral parts of the magnetic core are preferably parts which extend essentially in parallel to the leg of the magnetic core around which the windings are wound. In one embodiment, the lateral parts are lateral legs. A lateral air gap is an air gap. It is different from the bank air gap and from the central air gap.

In one embodiment, the current dependent inductivity comprises lateral air gaps in all or some of the lateral parts of the magnetic core in addition to a central air gap. This embodiment has the advantage that it can be assembled easily by stacking magnetic core parts having legs which are all of the same length and placing air gap materials in between.

In one embodiment the magnetic core of the current dependent inductivity comprises a central leg around which the windings are wound, a lateral part, a bottom part, a middle part and a top part. The bottom part connects the lower end of the central leg with the lower end of the lateral part.

The top part connects the upper end of the central leg with the upper end of the lateral part. The middle part connects the central leg with the lateral part at a height between the bottom part and the top part such that it touches neither the bottom part nor the top part. The bottom part, the lateral part, the middle part and the central leg define one or more winding windows. The bank air gap is arranged in the central leg at a height between the middle part and the top part. The central leg, the top part, the bottom part, the middle part and the lateral part are made of the same material. The smallest cross-sectional area of the bottom part is less or equal to the sum of the smallest cross-sectional area of the middle part and the smallest cross-sectional area of the top part. The smallest cross-sectional area of the middle part is smaller than the smallest cross-sectional area of the bottom part. Therefore, the middle part comprises the saturation region.

The lateral part can be a single piece such as a hollow cylinder or it can comprise multiple pieces such as two bars or two sections of a hollow cylinder arranged on opposite sides of the central leg.

In this embodiment, one magnetic flux path follows the central leg up to the middle part, continues through the middle part and from there into and through the lateral part. It enters then the bottom part, follows it and enters again the central leg such that the loop is closed.

Another magnetic flux path follows the central leg up to the top part and crosses the bank air gap on this way. It continues through the top part and from there into and through the lateral part. It enters then the bottom part, follows it and enters again the central leg such that the loop is closed.

Obviously, the two magnetic flux paths have a common region: This is the section of the central leg between the bottom part and the middle part, the section of the at least one lateral part between the bottom part and the middle part and the bottom part. The two paths differ however in the middle part and in the upper sections of the lateral part and of the central leg as well as in the top part.

Therefore there is a bifurcating magnetic flux path which bifurcates into a first path passing through the middle part and a second path passing through the bank air gap, the upper section of the central leg, the top part and the upper section of the lateral part.

The middle part, the central leg, the top part and the lateral part are all made of the same material, therefore they have the same relative, initial permeability. Consequently, the magnetic resistance at low winding currents of the first path is proportional to the ratio of the length over the cross-sectional area of the middle part. The magnetic resistance at low winding currents of the second path is proportional to the sum of a) the ratio of the length over the cross-sectional area of the bank air gap multiplied with the ratio of the permeability of the core material over the bank air gap material, b) the ratio of the length over the cross-sectional area of the section of the central leg between the top of the bank air gap and the top part.

c) the ratio of the length over the cross-sectional area of the top part and d) the ratio of the length over the cross-sectional area of the section of the lateral part between the top of the middle part and the top part.

The cross-sectional area and/or their permeability of the different parts may vary along their length. In this case, the magnetic resistance can be estimated by an integral over of the above given ratios along the length of the part with varying cross-section. The permeability may change because of saturation and/or temperature differences.

The middle part and the top part are essentially equal in length. Their cross-sections are in many cases different, however this difference is less than an order of magnitude in most cases. The ratio of the permeability of the core material and the bank air gap material is however in general greater than two to three orders of magnitude. Therefore, at low winding currents the magnetic resistance of the second path is larger than the magnetic resistance of the first path and that this difference is in most cases dominated by the effect of the bank air gap a).

Consequently, at low magnetic field strength and low winding currents, a large fraction of the magnetic flux passes through the first path and therefore the properties of the magnetic flux path "central leg up to the middle part—middle part—the lateral part starting from middle part—bottom part—central leg" determines the inductance of the inductivity.

With increasing magnetic field strength and winding currents, the first path starts to saturate and consequently its permeability decreases. Thereby the difference between the magnetic resistance of the first and the second path decreases and the fraction of the magnetic flux passing through the second path increases. At the first saturation magnetic current, the magnetic resistance of the second path is lower than the magnetic resistance of the first path. Therefore, most of the magnetic flux passes through the second path and therefore the properties of the path "central leg—top part—the lateral part—bottom part—central leg" determines the inductance of the inductivity.

With even further increase of the magnetic field strength and the winding current, also the second path may start to saturate and decreases thereby its permeability. However, as the smallest cross-sectional area of the bottom part is less or equal to the sum of the smallest cross-sectional areas of the top and middle part, the bottom part will saturate either before or essentially at the same time as the top part. Therefore large parts of the magnetic core will start to saturate at such high winding currents and the total inductance of the inductivity drops to low values.

It is an advantage of continuing the central leg between the middle and the top part because in the case of a lateral part partially surrounding the central leg or in the case of a lateral part comprising multiple pieces, the bank air gap is at least partially surrounded by core material which reduces fringing losses.

In one embodiment, there are at least two types of bank air gaps: on the one hand a material filled bank air gap between the two sections of the central leg and on the other hand an air filled bank air gap between the upper side of the middle part and the lower side of the top part in between the central leg and the lateral part.

In another embodiment, there is a material filled bank air gap between the two section of the central leg and the upper side of the middle part and the lower side of the top part and preferably this bank air gap has everywhere the same thickness.

Plotting the inductance of the inductivity over winding current creating the magnetomotive force, a decreasing curve evolves. In the case of a core material with sharp saturation properties, the curve comprises three plateaus with essentially constant inductance values over a certain interval of winding current. The height of first plateau is determined by the inductivity of the path "central leg up to the middle part—middle part—the lateral part starting from middle part—bottom part—central leg". This plateau ends at the first saturation current which is the winding current at which the magnetic resistance of the first path equals the magnetic resistance of the second path. The end of the first plateau can therefore be influenced by the cross-sectional area of the middle part and by the bank air gap. As the bank air gap influences also the height of the second plateau, it is in general advisable, to adapt the cross-sectional area of the middle part to determine the end of the first plateau. The height of the second plateau is determined by the inductance of the path "central leg with bank air gap—top part—the lateral part—bottom part—central leg". The inductance of this path is strongly influenced by the bank air gap and therefore the height of the second plateau can be set to a desired value smaller than the inductance of the first plateau by choosing a suitable size and material for the bank air gap. The second plateau ends at the winding current which creates a magnetic flied strength saturating the magnetic core somewhere outside the saturation region. This winding current is the final saturation current. The end of the second plateau can be set to a desired winding current by reducing or increasing the cross-section of the smallest cross section of the magnetic core outside of the saturation region.

In one embodiment, neither the central leg nor the lateral part continues above the middle part. Instead, there is a bank air gap of the size of the middle part covered with a flat top part of the size of the middle part. This embodiment has the advantage of a particular easy construction.

In one embodiment, the magnetic core comprises a central leg, a bottom part, a top part and a lateral part. The bottom part connects the lower end of the central leg with the lower end of the lateral part and the top part connects the upper end of the central leg with the upper end of the lateral part. A bank air gap is arranged along the lateral part in such a way that the lateral part is arranged between the bank air gap and the windings, which are wound around the central leg. An additional core layer made of the same material as the central leg, the bottom part, the top part and the lateral part is placed on the bank air gap. In this embodiment, the smallest cross-sectional area of the lateral part is smaller than the smallest one of the cross-sectional areas of the top and the bottom part. Further, the sum of the smallest cross-sectional area of the additional core layer and the smallest cross-sectional area of the lateral part is equal or greater than the smallest one of the cross-sectional areas of the top and the bottom part.

In this embodiment, there is one magnetic flux path passing through the central leg, the top part, the lateral part and the bottom part and another magnetic flux passes through the central leg, the top part, the bank air gap, the additional core layer, the bank air gap and the bottom part. The common region of these paths is the central leg, the top part and the bottom part. The first path follows the at least one lateral part. The second path passes the bank air gap a first time, follows the additional core layer and passes the bank air gap a second time.

In another embodiment, the bank air gap is arranged only along part of the lateral part such that there is a section close to the upper or close to the lower end of the lateral part, where there is a direct contact between the lateral part and the additional core layer. In this case the second path passes the bank air gap only once.

In one embodiment, the current dependent inductivity comprises three single piece components, which are a first component, a second component and a third component, a bank air gap component and preferably a central air gap component.

The first component is a single piece containing the bottom part, a lower section of the lateral part and a lower section of the central leg.

The second component is a single piece containing the middle part, a middle section of the lateral part and a middle section of the central leg.

The third component is a single piece containing the top part, an upper section of the lateral part and an upper section of the central leg.

The central air gap component, if present, is made of a material with a relative initial permeability at room temperature $\mu_r$ close to 1 which is to be arranged between the first and the second component.

The bank air gap component is made of a material a relative initial permeability at room temperature $\mu_r$ close to 1 which is to be arranged between the second and the third component.

The first, second and third component are made of the same material and preferably of ferrite in this embodiment.

This embodiment has the advantage of being particularly easy to construct: Essentially, the first, second and third component can be constructed from the same pre-fabricated part. While no work is needed on the first and the third component, at least part of the middle section of the second component need to be reduced in its thickness such that it can act as saturation region. Further, optional works include reducing the length of the central leg of the first, the second or both components in order to create space for a central air gap and/or reducing the length of the central leg and lateral parts of the third component in order to archive a more compact inductivity. It is also possible to make the central leg of the third component shorter than the lateral parts of the third component in order to create space for a bank air gap.

After this work, the inductivity can be constructed by simply stacking the components: The first component is placed with the bottom part down on a table. If desired, the central air gap component is placed on the central leg and, again if desired, on the lateral parts. The windings are arranged around the central leg. Then the second component is placed on the first component, such that its central leg contacts, if present, the central air gap component or, otherwise, the central leg of the first component and such that the lateral part of the second component contacts either the lateral part of the first component of the central air gap component placed on the lateral part of the first component. The bank air gap component is then placed onto the upper side of the second component and the third component is placed on top of it with its central leg and lateral parts pointing downwards and the top part directed upwards. The bank air gap material can be only between the central leg of the third component and the middle part or it can cover a larger fraction, especially the complete upper side of the middle part. The stack of components can be fixed with clamps, adhesive or other means known from the prior art.

This embodiment has the advantage that off-the-shelf pre-fabricated components can be used which need only small adaptations and therefore costs are minimized.

A power converter according to this invention comprises a choke. The choke comprises a passive, current dependent inductivity according to the invention.

Switched mode power converters comprise chokes to control the ripple current on the output. In many cases, a low ripple is desired at a nominal output power. In addition, a power converter should not break if for some reason a higher output current flows for a short period of time. During these non-nominal conditions, the amplitude of the ripple current is allowed to be significantly higher. Therefore, the use of a choke which is designed to lower the ripple current also as such high currents would increase the size, the weight and the costs of the power converter unnecessarily.

Using a choke inductivity which reduces its inductance to an intermediate value under high current conditions solves this situation: During nominal conditions, the inductance equals the value of the initial inductance plateau. The magnetic flux passes mainly through the first path and there is no significant saturation. However, in the case of a higher current, the inductance of the inductivity drops to the value of the intermediate inductance plateau. The ripple current is increased, which is acceptable as explained above. As the inductance has dropped, less energy is stored in the inductivity. Therefore, if the high output current situation stops rapidly, for example because a failure was detected, the self-inducted voltage is smaller compared to the case of an inductivity with constant inductance.

The intermediate inductance plateau value is higher than the inductance of a completely saturated core. Therefore, the current flowing through the windings is smaller than it would be at an even lower inductance. The windings and other electronic components of the electric current are consequently heated less than in the case of an even lower inductance.

Consequently, the requirements on the circuitry are lower, allowing a lighter, smaller and more cost efficient construction compared to cases where either the magnetic core has a sufficiently large size to avoid saturation at all and to cases where complete saturation of the magnetic core can happen.

The method of constructing a passive, current dependent inductivity according to the invention comprises the following steps:

a) Choosing a value of the first saturation current, a value of a final saturation current and a value of an intermediate inductance plateau.

b) Choosing the smallest cross-sectional area and the material of the saturation region such that the saturation region saturates when a winding current with the value of the first saturation current flows c) Choosing the thickness of the bank air gap such that the value of the inductance of the magnetic core equals the value of the chosen intermediate inductance plateau when a winding current with the value greater than the first saturation current but lower than the final saturation current flows, d) Choosing the dimensions and the material of the magnetic core such that it saturates outside the saturation region when a winding current with the value of the final saturation current flows through the magnetic core.

The first saturation current and the final saturation current are winding currents flowing through the windings and creating thereby a magnetic field which results in saturation effects in special regions of the magnetic core. The core may comprise more than one saturation region, for example in the case of an E-I-core with windings on the central leg of the E and two saturation regions along the common bar of the E. The term "common bar" denotes here and in the following a piece of magnetic material connecting a set of legs of a component of a magnetic core. In such a case, the magnetic flux flowing through one of the saturation regions is lower than the magnetic flux created by the current flowing through the windings, as the magnetic flux in the central leg splits in two saturation regions. The first saturation current is the winding current at which both saturation regions start to show significant saturation effects. If this does not happen at essentially the same winding current, preferably, only the region which starts to show saturation effects at the lower winding current is a saturation region. Analogously, the final saturation current is current flowing through the windings creating a magnetic field such that a part of the core different from the saturation regions starts to show significant saturation effects.

"Significant saturation effects" start to occur preferably at the magnetic field strength H at which there is the maximum of the curve of the amplitude permeability on the y-axis and the applied magnetic field strength H on the x-axis. Preferably, the beginning of significant saturation effects is determined at an estimated working temperature of the passive, current dependent inductivity. In another embodiment, the beginning of significant saturation effects is determined once at 25° C. and once at 100° C. and the beginning of significant saturation effects is assumed to happen at the arithmetic average of the applied magnetic field strength H values of these two measurements. By the knowledge of the amplitude permeability at this magnetic field strength values, the value of the magnetic flux density B at saturation is known.

The magnetic flux is the product of the B-field and the cross-sectional area. Further, the magnetic flux produced by the winding current can be estimated to be the number of the windings times the windings current divided by the magnetic resistance of the total magnetic circuit. Thereby, knowing the geometry of the magnetic circuit and keeping the cross-sectional area of the saturation region as an unknown, the magnetic flux passing through the saturation region at a winding current equal to the first saturation current can be expressed as function of the cross-sectional area. This magnetic flux divided by the cross-sectional area should equal the magnetic flux density B at saturation. This expression can be solved for the cross-sectional area giving a first estimate for the smallest cross-sectional area in the saturation region.

A similar approach can be used with the final saturation current instead of the first saturation current in order to calculate a first estimate for the smallest cross-section of the magnetic core outside the saturation region.

Therefore, the first and final saturation magnetic fluxes can be reached by choosing suitable cross-sectional areas and/or by choosing a core material which saturates at a different B-field value.

If a higher level of certainty is needed, one can design a prototype design based on the estimates and modify it based on the results of computer-simulations and/or experimental results.

The step c), choosing the thickness of the bank air gap, can be done as follows:

The winding current should have a value greater than the first saturation current and lower than the final saturation current. In this condition, the saturation regions are saturated but the rest of the core is not-saturated. Consequently, there are essentially three types of regions in the magnetic circuit: air gaps with a very low permeability, saturated regions with a low permeability and nominal regions with a high permeability.

The magnetic resistance of a region can typically be estimated to equal the ratio of the length of this region over the product of the permeability and its cross-sectional area. The length and the cross-sectional area are measured along respectively perpendicular to the magnetic flux lines.

The total magnetic resistance between the joint points of two regions arranged parallel to each other can be estimated to be the reciprocal value of the sum of the reciprocal values of the magnetic resistance of the two regions. The total magnetic resistance between regions connected in series can be estimated to be the sum of the magnetic resistances of these regions. The total inductance can then be estimated to be the ratio of the square of the number of turns of the winding divided by the total magnetic resistance of the core. The air gaps of the core will dominate the total magnetic resistance and preferably, the bank air gap is the only air gap with unknown thickness. This unknown thickness is the length of the bank air gap region is the formula to estimate the magnetic resistance given above.

Therefore, the thickness of the bank air gap can be chosen such that a desired induction is obtained according to the estimates given above. If a higher level of certainty is needed, one can design a prototype design based on the estimates and modify it based on the results of computer-simulations and/or experimental results.

The value of the intermediate inductance plateau is preferably the desired inductance at a winding current which equals the arithmetic average of the first saturation current and the final saturation current.

In one embodiment, the value of the intermediate inductance plateau is preferably the desired inductance at an intermediate winding current which has a value between the first saturation current and the final saturation current and which is of importance for the final application. For example, the first saturation current can be an upper limit for the current expected during standard use of a device connected to a power converter comprising the current depending inductivity, the intermediate winding current can be a current expected during an exceptional use of the device and the final saturation current can be a lower limit for a current occurring close to or at a failure of the device.

In one embodiment, the method of constructing a current dependent inductivity with a central air gap comprises in addition to the steps of the method of constructing a current dependent inductivity, the following steps:

a) Choosing a value of an initial inductance plateau b) Choosing the thickness of the central air gap such that the inductance of the inductivity equals the value of the chosen initial inductance plateau when the winding current is less than the first saturation current The central air gap is preferably located on the leg around which the windings are wound. Such a central air gap is even at low winding currents part of the magnetic circuit and influences therefore the inductance of the inductivity even at very low winding current in the absence of any saturation effects.

Choosing the thickness of the central air gap can be done as follows:

The winding current should have a value lower than the first saturation current. In this condition, the core is not saturated. Consequently, there are essentially two types of regions in the magnetic circuit: air gaps with a very low permeability and nominal regions with a high permeability.

As explained above, the magnetic resistance of a region can typically be estimated to equal the ratio of the length of this region over the product of the permeability and its cross-sectional area. The lengths are measured along the magnetic flux lines. The cross-sectional areas are measured perpendicular to the magnetic flux lines.

The total magnetic resistance between the nodal points of two regions arranged in parallel to each other can be estimated to be the reciprocal value of the sum of the reciprocal values of the magnetic resistance of the two regions. The total magnetic resistance between regions connected in series can be estimated to be the sum of the magnetic resistances of these regions.

The total inductance can then be estimated to be the ratio of the square of the number of turns of the winding divided by the total magnetic resistance of the magnetic core.

The central air gap will dominate the total magnetic resistance in the situation at hand. This unknown thickness of this central air gap is the length of the central air gap in the formula to estimate the magnetic resistance given above.

Therefore, the thickness of the central air gap can be chosen such that a desired induction is obtained according to the estimates given above. If a higher level of certainty is needed, one can design a prototype design based on the estimates and modify it based on the results of computer-simulations and/or experimental results.

Other advantageous embodiments and combinations of features come out from the detailed description below and the entirety of the claims.

BRIEF DESCRIPTION OF THE DRAWINGS

The drawings used to explain the embodiments show:

FIG. 3b A cross-sectional view of the passive, current dependent inductivity according to a fourth embodiment constructed from the parts of FIG. 3a.

In the figures, the same components are given the same reference symbols.

PREFERRED EMBODIMENTS

Figure 1A:
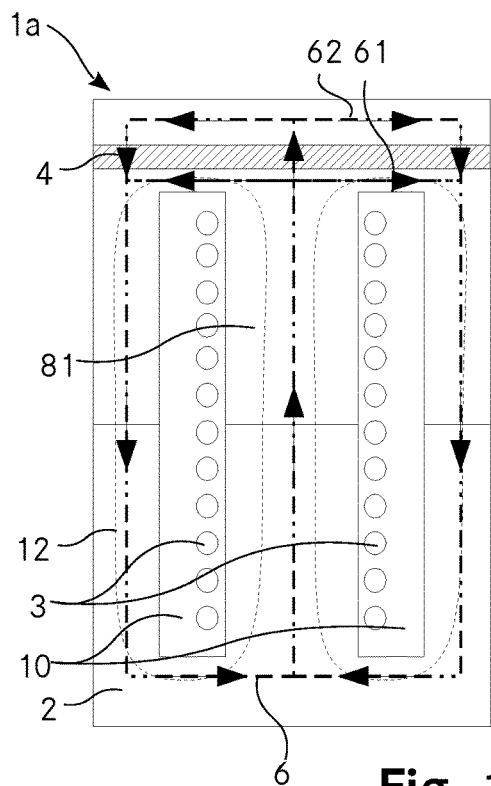
FIG. 1a A cross-sectional view of a first embodiment of a passive, current dependent inductivity with an unsaturated saturation region and magnetic flux paths.

FIG. 1 shows a cross-sectional view of a first embodiment of a passive, current dependent inductivity 1a with an unsaturated saturation region 5. In addition, the magnetic flux paths 6 and magnetic field lines 12 are indicated.

The inductivity 1a comprises a magnetic core 2, windings 3a and a bank air gap 4. In the cross-sectional view, the magnetic core 2 appears as a rectangle with two windings windows 10 which have also rectangular shape. The inductivity 1a can be formed from two E-core components or from two pot cores components or from other core shape components which appear rectangular in a cross-sectional view.

The cross-sectional view of the inductivity 1a is symmetric with respect to the longitudinal axis of the windings 3. The windings 3 are wound around a central leg 81. The cross-sectional view of the inductivity 1a is not symmetric with respect to an axis perpendicular to the longitudinal axis: While there is only magnetic core material on one side of the winding windows 10, the bank air gap 4 is arranged between two sections of magnetic core material on the opposite side of the winding windows 10.

A magnetic field is created by a current flowing through the windings 3. The magnetic flied lines 12 run along the central leg 81. The magnetic flied lines close by surrounding the winding windows 10. Due to the high permeability of the magnetic core 2 compared to the permeability of the surrounding air, the magnetic field is guided and concentrated in the magnetic core 2.

The inductivity 1a defines a magnetic circuit with magnetic flux paths 6.

In the case of an inductivity 1a made of two E-core components, the magnetic core 2 comprises two lateral legs arranged on opposite sides and in parallel to the central leg 81. The legs are connected at both ends with a common bar. One of these common bars is divided along its length by the bank air gap 4. This common bar is called gapped common bar while the other common bar is called un-gapped common bar. The part of the gapped common bar delimiting the windings windows is called inner part while the rest of the gapped common bar is called outer part. In this case, there are two bifurcating magnetic flux paths in FIG. 1a to 1c.

Figure 1C:
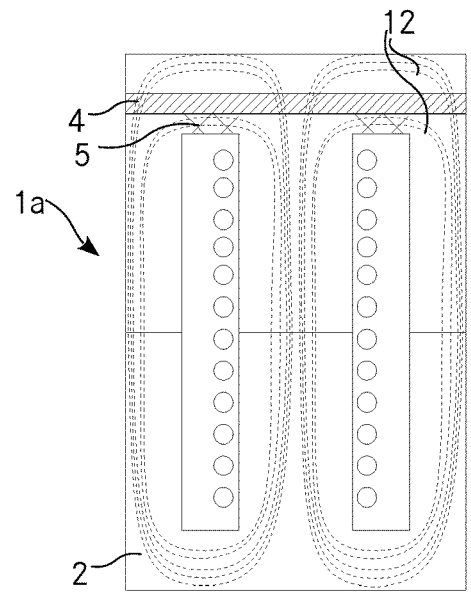
FIG. 1c A cross-sectional view of the passive, current dependent inductivity of FIG. 1a with a saturated saturation region.
Figure 1B:
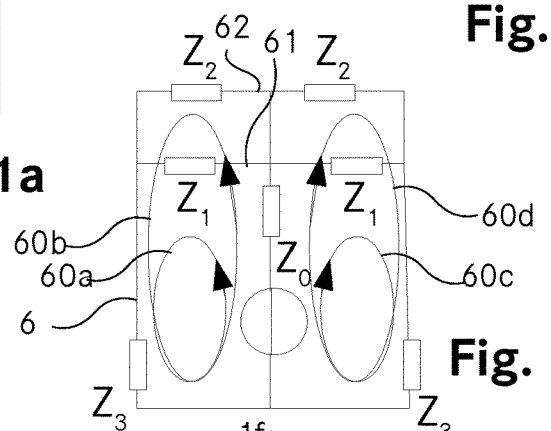
FIG. 1b The magnetic circuit of the first embodiment realized with two E-core-components.

FIG. 1b shows the magnetic circuit 6 of this case.

The two loops defining the bifurcating magnetic flux paths are the following: "central leg 81—one half of the inner part of the gapped common bar-lateral leg-one half of the un-gapped common bar" and "central leg 81—bank air gap—one half of the outer part of the gapped common bars—bank air gap—lateral leg—one half of the un-gapped common bar". The common region of these two flux paths is "lateral leg—one half of the un-gapped common bar—central leg". The first path 61 is therefore "one half of the inner part of the gapped common bar" and the second path 62 is "bank air gap—one half of the outer part of the gapped common bars—bank air gap".

In the case of an inductivity 1a made of two E-core components, the width of the core material perpendicular to the cross-sectional plane is everywhere the same. Therefore, in order to compare the areas crossed by the magnetic flux, it is sufficient to compare the apparent thicknesses in the cross-sectional view shown in FIG. 1a. The thicknesses should be measured perpendicular to the magnetic flux at the given position.

In FIG. 1a, the thickness of the un-gapped common bar equals the thickness of a lateral leg and both lateral legs have the same thickness. Further, the thickness of the central leg 81 is twice the thickness of the un-gapped common bar. The thickness of the inner part of the gapped common bar is significantly smaller than the thickness of the un-gapped common bar. The thickness of the outer part of the gapped common bar is such that the sum of the thicknesses of the inner and outer part of the gapped common bar equals the thickness of the un-gapped common bar.

The magnetic resistance of a part is proportional to the ratio of the length of the magnetic flux path divided by the product of the area passed by the magnetic flux and the relative permeability of the material.

In FIG. 1a, there is only one magnetic core material. As long as only a small current flows through the windings, the magnetic field is small and the relative permeability is essentially the same everywhere in the magnetic core except for the bank air gap as there are no saturation effects. The permeability of the material of the bank air gap is significantly smaller than the one of the magnetic core material.

Both, the first and the second path comprise a piece of the same magnetic core material having the same length. The cross-sectional area of the inner part of the gapped common bar is smaller than the cross-sectional area of the outer part of the gapped common bar. Therefore, the magnetic resistance of the inner part of the gapped common bar is greater than the magnetic resistance of the outer part of the gapped common bar. But the second path 62 comprises, in addition to the outer part of the gapped common bar, also the bank air gap 4 which is passed twice by the second path 62. As the permeability of the bank air gap material is typically 2 to 3 orders of magnitude smaller than the permeability of the magnetic core material under the assumed conditions of a small magnetic field and a temperature of 25°, crossing the bank air gap 4 twice increases the magnetic resistance of the second path 62 such that it is higher than the magnetic resistance of the first path 61.

At low magnetic fields, most of the magnetic flow lines follow essentially the first path 61 as it has the lower magnetic resistance. However, at the first saturation current 7a, there are so many flow line following the first path 61, that the inner part of the gapped common bar with the small cross-sectional area starts to show significant saturation effects. This results in a decrease of the permeability and therefore in an increase of the magnetic resistance in the saturation region with the small cross-section area of the gapped common bar. This region is the saturation region 5. When the first saturation current 7a flows through the windings 3, the permeability of the saturation region 5 has such a value that the magnetic resistance of the first path 61 is lower that then magnetic resistance of the second path 62.

FIG. 1c shows the passive, current depending inductivity 1a of FIG. 1a in the same cross-sectional view. Again magnetic field lines 12 are indicated. In FIG. 1c, the current flowing through the windings 3 is greater than the first saturation current 7a. In this case, the magnetic resistance of the first path 61 is, due to saturation effects in the saturation region 5, greater than the magnetic resistance of the second path 62. Therefore, most of the magnetic flux follows the second path 62. However, the overall magnetic resistance has increased compared to the non-saturated case shown in FIG. 1a and therefore the inductance of the inductivity 1a is reduced compared to the low winding current situation.

Significant fringing fluxes appear where the magnetic flied crosses air gaps: As the permeability of the air gap material is close to the permeability of the air at the same conditions, the flow lines widen and the magnetic flux flows through a cross-sectional area which is greater than the cross-section area of the magnetic core elements though which the magnetic flux is guided to the air gap. If these fringing flow lines cross an electrically conducting material, eddy currents are induced which cause energy losses, thereby heating the conducting material. In the inductivity according to the invention, the winding is preferably the only part which conducts electricity well. By ensuring that there is always the saturation region 5 or some other magnetic core material in between the bank air gap 4 and the winding 3, fringing fluxes created by the passage of the bank air gap 4 are prevented from interaction with the winding 3.

FIG. 1b shows the magnetic circuit 6 created by the current depending inductivity 1a shown in FIGS. 1a and 1c in the case of an inductivity constructed of two E-core components. The windings with an electric current flowing through them create a magnetic voltage which is represented by the symbol of a circle with a vertical line in it. The magnetic voltage or magnetomotive force is the product of the number of windings and the winding current.

There are two parallel paths for the magnetic flux and both comprise two loops which fulfill the criteria for being a magnetic flux path (60a, 60b, 60c, 60d): All further loops include air gaps of greater length and have therefore a significantly higher magnetic resistance. The two smaller magnetic flux paths 60a and 60c are similar to each other and the two larger magnetic flux paths 60b and 60d are similar to each other, too. All magnetic flux paths have the magnetic resistance $Z_0$ in common. This $Z_0$ represents the magnetic resistance of the central leg 81. Every pair of a small and a large magnetic flux path, for example 60a and 60b, have the magnetic resistance $Z_3$ in common which represents the magnetic resistance of one lateral leg and the magnetic resistance of half of the un-gapped common bar. $Z_3$ has the same value for both pairs of a small and a large magnetic flux path due to the symmetry of the inductivity 1a. Finally, the both of the small loops 60a and 60c comprise the magnetic resistance $Z_1$, representing the magnetic resistance of the inner part of the gapped common bar which comprises the saturation region 5. Both of the large loops 60b and 60d comprise the magnetic resistance $Z_2$, representing the magnetic resistance of the bank air gap 4 and the outer part of the gapped common bar.

An estimate of the total magnetic resistance of the inductivity can therefore be calculated to be:

$$Z_{ges} = Z_0 + \frac{1}{2}Z_3 + \frac{1}{2}\frac{1}{\frac{1}{Z_1} + \frac{1}{Z_2}}.$$

If $Z_1$ increases due to saturation effects in the saturation region 5, the total magnetic resistance increase but only up to a value which is determined by the value of $Z_2$. This value can then be kept with increasing winding current until another region of the magnetic core 2 starts to saturate and causing thereby an increase of $Z_0$, $Z_2$ or $Z_3$, which results in an increase of $Z_{ges}$.

FIGS. 1a and 1b show cross-sectional views of a passive, current depending inductivity. Above, the situation was explained in detail for the case of an inductivity constructed from a pair of E-core components. However, a pair of pot core components has the same cross-sectional view. This case differs from the case of a pair of E-core components in so far as the cross-sectional area is not simply proportional to the apparent thickness of the core in the cross-sectional view but depending in addition on the distance from the longitudinal axis of the central leg 81. Therefore the saturation region 5 and its behavior are more difficult to estimate: The region with the smallest cross-sectional area is only a hollow cylinder with a thin wall, its height being the thickness of the inner part of the gapped common bar and its radius is essentially the radius of the central leg and therefore half of the thickness of the central leg as shown in the cross-sectional view. This region with the smallest cross-sectional area will saturate first, behaving thereby like a thin air gap. With increasing winding current, the wall thickness of the cylinder of saturated core material will increase up to the point where the magnetic resistance of the first path 61 is greater than the magnetic resistance of the second path 62. The volume of the cylinder including the saturated core material is the saturation region in this case. The wall-thickness of this cylinder depends, in contrast to the two E-core-component situation, also on the saturation behavior of the core material: In the case of a sharp saturation behavior the saturation region 5 is smaller than in the case of a soft saturation behavior in the two pot-core component situation.

The magnetic circuit, however, becomes simpler in the two-pot core component situation: It reduces to only half of what is shown in FIG. 1b and comprises only one small loop 60a and one large loop 60b. An estimate of the total magnetic resistance of the inductivity can therefore be calculated as:

$$Z_{ges} = Z_0 + Z_3 + \frac{1}{\frac{1}{Z_1} + \frac{1}{Z_2}}.$$

Of course, the embodiment of FIG. 1a can also be realized with further magnetic core components of different shapes having a cross-section as shown in FIG. 1a. These are for example RM-core components.

Figure 2A:
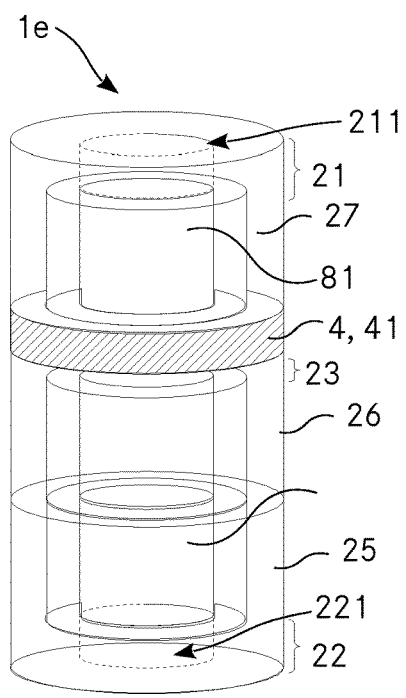
FIG. 2a A perspective view of a passive, current dependent inductivity according to a fifth embodiment constructed from pot core components.

FIG. 2a show a fifth embodiment of a passive, current dependent inductivity 1e. The inductivity is constructed from three pot core components and a bank gap component 41. The three pot core components are a first, a second and the third component 25, 26 and 27. The first and the third component 25 and 27 have the same geometry. The second component 26 is arranged between the first and the third component 25 and 27 and differs from them by having a common bar which is thinner compared to the one of the first and the third component 25, 27. The common bar is the part of the pot core which connects the solid cylinder which acts as section of the central leg 81 and the surrounding hollow cylinder which acts as section of the lateral part or lateral leg. The space between this central leg section and the lateral leg or lateral part sections of the first and the second component 25 and 26 is the winding window 10. The winding is not shown in FIG. 2a. The first and the second component 25 and 26 are arranged such that the central leg sections and the lateral leg sections touch each other. The second and the third component 26 and 27 are separated by the bank air gap 4 which is realized by a bank air gap component 41 of a desired thickness. The third component 27 is arranged such that its legs point towards the bank air gap 4.

Instead of describing the geometry by the components it is built of, one could also describe it independently of the components: In this wording the inductivity 1e comprises a central leg 81 which is a solid cylinder comprising all the central leg sections and in addition parts of the common bars of the first 25, the second 26 and the third component 27. In addition the inductivity 1e comprises a lateral part 24 in the shape of a hollow cylinder which comprises the later leg sections of the first 25, the second 26 and the third component 27. A top part 21 in the shape of a short hollow cylinder connects the upper end of the central leg 81 and with the upper end of the lateral part. A bottom part 22 connects the lower end of the central leg 81 with the lower end of the lateral part. A middle part 23 connects the central leg 81 and the lateral part somewhere in between the top part 21 and the bottom part 22.

The lateral leg section or the section of the lateral part of the first component 25 and part of the common bar of the first component 25 are together the lower section of the lateral part 24a. The lateral leg section or the section of the lateral part of the second component 26 and part of the common bar of the second component are together the middle section of the lateral part 24b. The lateral leg section or the section of the lateral part of the third component 27 and part of the common bar of the third component are together the top section of the lateral part 24c.

The central leg section and part of the common bar of the first component 25 are together the lower section of the central leg 81a. The central leg section and part of the common bar of the second component 26 are together the middle section of the central leg 81b. The central leg section and part of the common bar of the third component 27 are together the top section of the central leg 81c.

The smallest cross sectional areas which can be used to estimate the dependence of the total inductance on the current flowing through the winding are indicated by dashed lines: the smallest cross-sectional areas of the top part 211 and the bottom part 221 have the same shape in this example and they have both the shape of a cylindrical surface with a height equal to the thickness of the common bar of the first and the third component 25 and 27 and a radius equal to the radius of the central leg 81.

The smallest cross-sectional area of the middle part, which characterizes the saturation region is not visible as the bank air gap component 41 covers it in the view shown in FIG. 2a. However, it is similar to the smallest cross-sectional area of the top part 211 and the bottom part 221 with the only difference being its height.

Figure 2B:
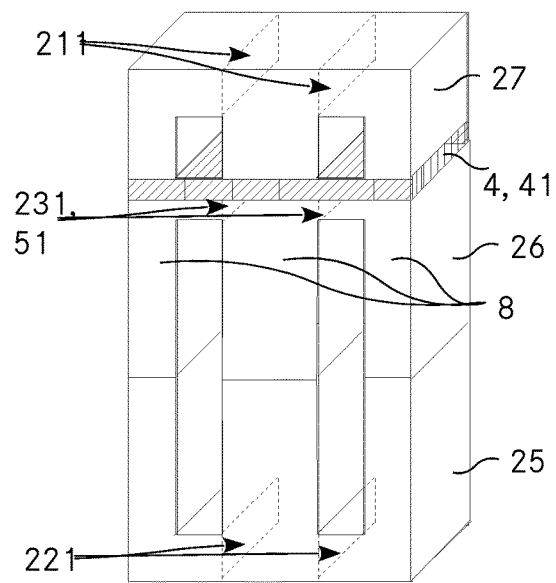
FIG. 2b A perspective view of a passive, current dependent inductivity according to a fifth embodiment constructed from E-core components.

FIG. 2b shows a sixth embodiment of a passive, current dependent inductivity. The inductivity is constructed from three E-cores components and a bank gap component 41. The central leg 81 has the shape of a cuboid with a length, a width and a height, and there are two lateral parts in the shape of cuboid with a width and a height equal to the one of the central leg 81 but a smaller length. The central leg 81 and the two lateral parts are connected by a top part, a middle part and a bottom part, whereby every one of these parts comprises two cuboids with a width equal to the width of central leg 81. The length of all cuboids of the top part, a middle part and a bottom part is the same and defines the distance between the central leg 81 and both lateral parts. The heights of the cuboids of the top part and the bottom part are the same. The heights of the cuboids of the middle part are smaller than the heights of the cuboids of the top and the bottom part. The cuboids of the top part are arranged between the upper ends of the central leg 81 and the lateral parts. The cuboids of the bottom part are arranged between the lower ends of the central leg 81 and the lateral parts. The cuboids of the middle part are arranged in the same height between the central leg 81 and the lateral parts and between the bottom and the top part.

In a cross-sectional view, FIGS. 2a and 2b would be the same. Because of the missing rotational symmetry, the sixth embodiment comprises two bisecting magnetic flux paths and consequently two smallest cross-sectional areas in the top, middle and bottom part. The shape of the smallest cross-sectional areas in the top part 211 and the bottom part 221 are again the same: They are all rectangles with side lengths equal to the width and the height of the cuboids of the top and bottom part. The shape of the smallest cross-sectional areas in the middle part 231 are also rectangles with side lengths equal to the width and the height of the cuboids of the middle part but they are smaller as the height of the middle part is smaller than the height of the bottom and top part.

Figure 3A:
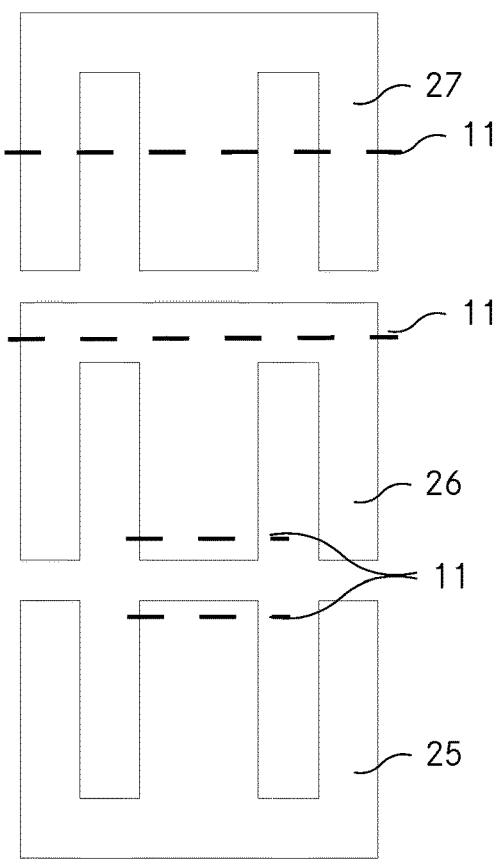
FIG. 3a A cross-sectional view of off-the-shelf-components useable to construct a passive, current dependent inductivity according to a fourth embodiment.
Figure 3B:
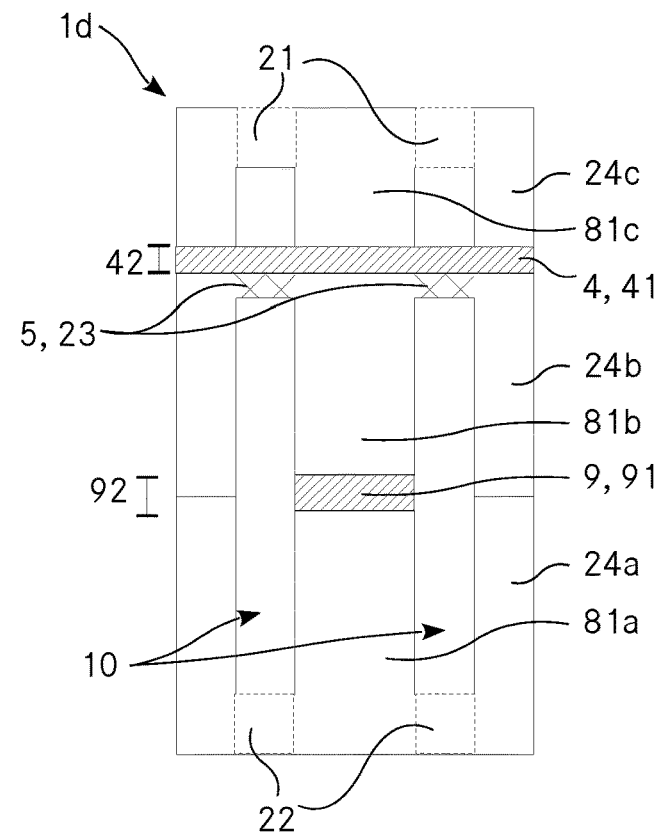

FIGS. 3a and 3b illustrate how a passive, current dependent inductivity according to a fourth embodiment 1d can be built from three off-the-shelf core components 25, 26 and 27. Again, the components as well as the inductivity are shown as cross-sections.

The passive, current dependent inductivity according to the fourth embodiment 1d is shown in FIG. 3b.

It comprises a bank air gap 4 and a central air gap 9. A bank air gap component 41 is arranged in the bank air gap 4. A central air gap component 91 is arranged in and fills the central air gap 9.

The bank air gap 4 differs in its thickness: In the extension of the winding windows 10, the bank air gap component 41 is followed by a room filled with air. Thereby the shape of the cross section of the core material separated from the winding 3 by the bank air gap 4 has an E-shape with a top central leg section 81c in the middle along the extension of the middle and lower central leg sections, 81b and 81c, and two lateral legs forming a top section of a lateral part 24c on opposite sides of the top central leg section 81c along the extension of the lower and middle lateral part sections 24a and 24b.

The lateral part sections and the central leg sections of each part are connected by the top part 21, the middle part 23 and the bottom part 24 respectively.

The varying thickness of the bank air gap 4 follows from the fact that the height of the top part 21 is smaller than the height of the top section of the lateral part 24c and the top section of the central leg 81c.

In one variant of the embodiment shown in FIG. 3b, the bank air gap thickness varies in such a way that it approaches locally a plane perpendicular to the longitudinal axis of the winding which is arranged closer to the winding window than a plane perpendicular to the longitudinal axis of the winding which runs through the region where the bank air gap has its minimum thickness.

FIG. 3a shows the three off-the shelf core components 25, 26 and 27 in the cross section from which the inductivity can be constructed. All components have the same shape and all appear in the cross section as E's.

From a first component 25, a part of the middle leg section is removed, for example by cutting along the cutting line 11. The removed material has a thickness which equals half of the thickness of the desired central air gap 9.

The second component 26 is prepared by also removing part of the middle leg section, for example by cutting along the cutting line 11. The removed material has a thickness which equals half of the thickness of the desired central air gap 9. In addition, part of the common bar, connecting the legs of the second component 26 is removed and thereby the thickness of the common bar is reduced. This can be done by cutting along the cutting line 11.

The third component 27 is prepared by cutting off parts of all its legs, thereby reducing its size.

After preparing the first, second and third component 25, 26, and 27, a central air gap component 91 with a thickness equal to the desired thickness of the central air gap is placed on the middle leg section of the prepared first component 25. The second component 26 is placed onto the combination of the first component 27 and the central air gap component 91 such that its middle leg section contacts the central air gap component 91, too and such that the lateral legs of the first and the second component 25 and 26 are in contact with each other. A bank air gap component 41 is placed on the prepared common bar of the second component 26. The thickness of the bank air gap component 41 equals the desired minimum thickness of the bank air gap 4. Then the third component 27 is arranged such that all of its legs contact the bank air gap component 41. In this arrangement, all middle legs sections of all components are arranged in one line. Also, there are always three lateral legs of the same cross-sectional shape arranged along a line.

The stack of first, second and third component 25, 26 and 27 and the central air gap component 91 and the bank air gap component 41 is preferably fixed by clamps or similar means.

In another embodiment, the first component 25 is not changed and there is also no removal of parts of the middle leg section of the second component 26. In this case there is either no central air gap 9 at all and the legs of the second component 26 are placed directly onto the legs of the first component 25 or there are air gaps, preferably lateral air gaps, in the lateral part 24 as well as in the central leg 81 and these air gaps are realized by arranging air gap components on the middle leg section and on all lateral legs of the first component 25 before arranging the legs of the second component 26 onto it. In addition or alternatively, the third component 27 is not changed but placed as it is onto the bank air gap component 41.

Preferably, the winding 3 is arranged around the middle leg section of the first or the second component 25, 26 before the two components are arranged relative to each other.

In one embodiment, the passive, current depending inductivity is constructed from two RM14/I core components made of ferrite material. The ferrite material can be, for example a material with the following properties: At 25° C., a frequency of 10 kHz and a magnetic flux density B of less than 0.25 mT, the initial, relative permeability of this material is around 600. The saturation magnetic flux density at 25° C. is around 500 mT. The legs of the RM14/I core components have a height of 10.4 mm, its central leg has a diameter of 15 mm, and its common bar has a thickness of 4.65 mm. The common bar of one of the RM14/I core components is reduced to 1.5 mm or to 2.5 mm thickness. The windings comprises 4 turns with 250×0.1 mm diameter stranded copper wire. The two core components are arranged with their legs pointing towards each other. A central air gap and additional air gaps in the lateral legs are realized by arranging an air gap component of a constant height of 0.25 mm between all legs of the two core components. A bank air gap with a thickness of 0.25 mm or 0.45 mm is realized by arranging an air gap component of 0.25 mm or 0.45 mm respectively onto the common bar with reduced thickness.

At 22° C. ambient temperature, the first saturation effects occur in the current depending inductivity according to this embodiment and in the case of the common bar thickness of 1.5 mm at a first saturation current of around 11 A. In the case of the common bar thickness of 2.5 mm at a first saturation current of around 21 A. The initial induction plateau is in all variations of this embodiment at around 9.5 µH. The intermediate induction plateau drops from 5.5 to 4.5 µH in the case of the 0.45 mm bank air gap and the 2.5 mm common bar thickness. The intermediate induction plateau drops from 5 and 4 µH in the case of the 0.45 mm bank air gap and the 1.5 mm common bar thickness. The intermediate induction plateau drops from 6 and 5 µH in the cases of the 0.25 mm bank air gap and the 1.5 mm and 2.5 mm common bar thickness.

Figure 4:
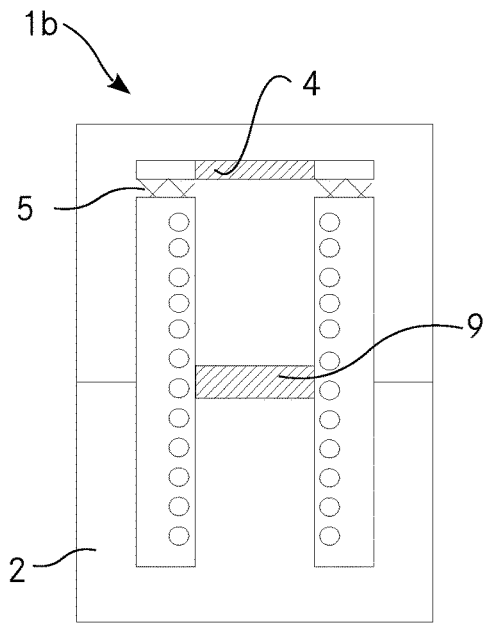
FIG. 4 A cross-sectional view of a second embodiment of a passive, current dependent inductivity.

FIG. 4 shows a second embodiment of a passive, current depending inductivity 1*b*. It is again a cross-sectional view which is shown. In contrast to the first embodiment 1*a*, the inductivity 1*b* comprises a central air gap 9 located on the central leg 81 surrounded by the winding 3. Further, the bank air gap 4 does not divide the gapped common bar completely in two parts but it is rather an opening delimited on its sides by extensions of the lateral legs. In addition, the bank air gap 4 is only partially filled with a solid air gap material and it is otherwise filled with air. The air gap material is located in the part of the bank air gap directly in extension of the central leg 81. The saturation region 5, shown for the case of an E-core geometry, is located between the air filled parts of the bank air gap 4 and the winding windows 10.

Again, as in the case of the first embodiment, the second embodiment can be realized with pot cores, RM-cores and other core geometry analogously. The shape and size of the saturation region will vary accordingly because of the dependency of the cross sectional area on the distance from the longitudinal axis of the winding and the shape of the cores.

This embodiment has the additional advantage that there is no air gap on the outside of the magnetic core 2. Therefore, fringing fluxes leaving the inductivity are minimized reducing the influence of the inductivity on its surroundings.

Figure 5:
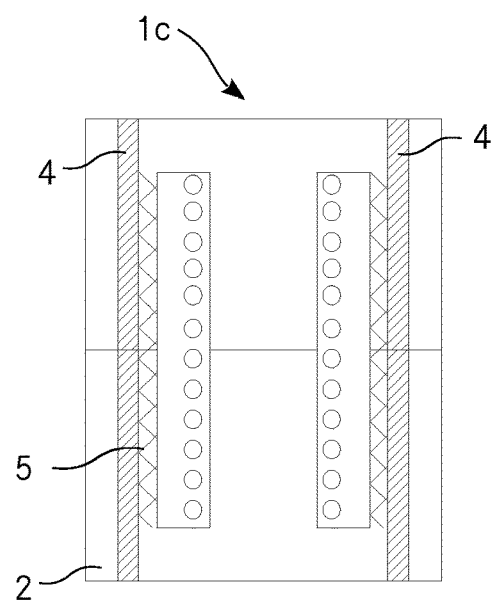
FIG. 5 A cross-sectional view of a third embodiment of a passive current dependent inductivity.

FIG. 5 shows a third embodiment of a passive, current depending inductivity 1*c*. It is again a cross-sectional view which is shown. In contrast to the first embodiment 1*a*, the bank air gap 4 runs parallel to the longitudinal axis of the windings 3. In this embodiment, the common bars above and below the winding windows have the same geometry. The bank air gap 4 divides the lateral legs in an inner and an outer part. The saturation region 5 is the inner part of the lateral legs in the region of the winding 3.

Again, as in the case of the first embodiment, the third embodiment can be realized with pot cores, RM-cores and other core geometry analogously. The shape and size of the saturation region will vary less than in the case of the first and the second embodiment because the band gap and the inner part of the lateral legs have a constant distance from the longitudinal axis of the winding. The shape of the cores can influence the shape and size of the saturation region.

Figure 6A:
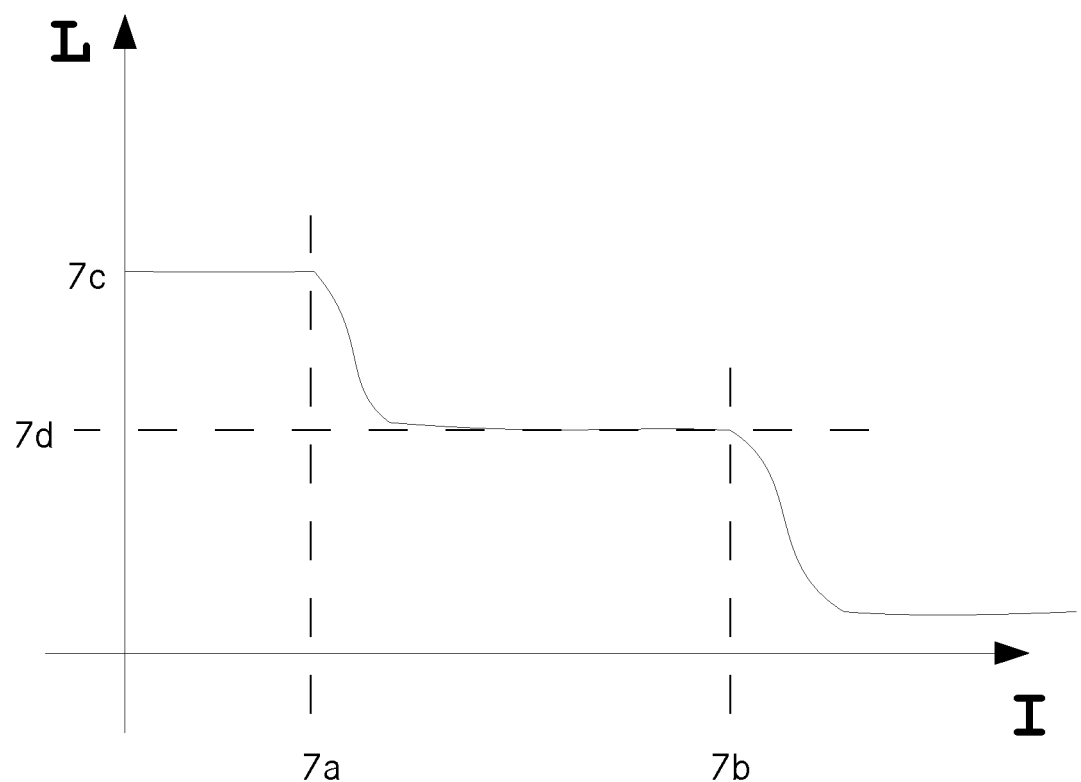
FIG. 6a A diagram showing the inductance of a passive, current dependent inductivity with a sharp saturating magnetic core material on the vertical axis and the winding current on the horizontal axis.
Figure 6B:
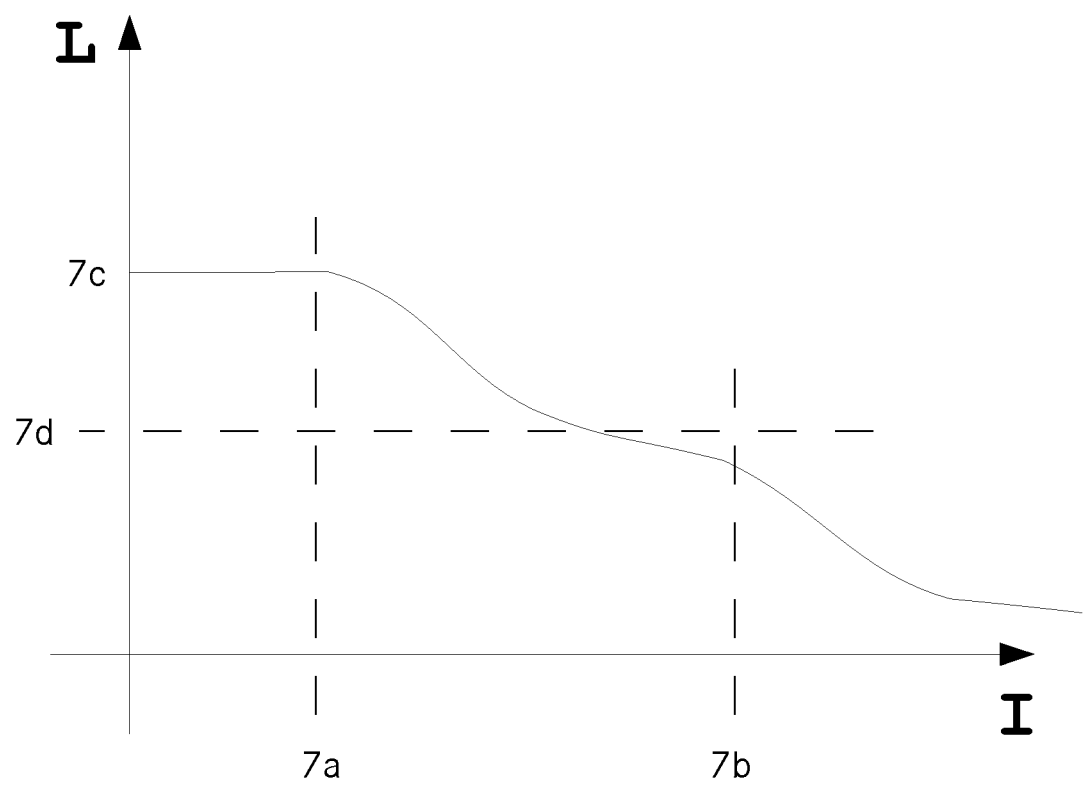
FIG. 6b A diagram showing the inductance of a passive, current dependent inductivity with a soft saturating magnetic core material on the vertical axis and the winding current on the horizontal axis.

FIGS. 6*a* and 6*b* show the dependence of the inductance L in dependence of a DC winding current I. The product of the current flowing through the windings and number of the windings is the magnetomotive force.

The curve comprises two plateaus: The first plateau indicates the winding current interval during which no part of the inductivity is in saturation. The value of this first inductance plateau 7*c* is determined by the choice of the magnetic core material, by the dimensions of the core and by a central air gap or other air gaps which are crossed by the magnetic flow even at low winding currents.

Once the saturation region begins to saturate, the magnetic resistance of the inductivity increases which lowers the inductance. The curve drops, starting at a first magnetic saturation current 7a. Once a complete saturation is reached, the inductance value is at an intermediate inductance plateau 7d. This value is determined by the magnetic resistance of the second path which is influenced by the bank air gap thickness. At the final saturation current 7b, other parts of the core, which do not belong to the saturation region, start to saturate. Consequently, the magnetic resistance increases even further, and the inductance decreases.

In FIG. 6a, the core material saturates sharply. The increase in magnetic resistance due to saturation effects is strong once the winding current at which saturation begins is reached. Full saturation is reached by a small increase of the winding current. This results in a fast transition between the different induction plateaus.

In FIG. 6b, the core material saturates soft. The increase in magnetic resistance due to saturation effects is slow once the winding current at which saturation begins is reached. To reach full saturation, the winding current has to increase more than in the case of a sharp saturation. This results in smooth transitions between the different induction plateaus. Further, it may happen that the saturation of the saturation region is not fully completed before the saturation of other parts of the core begins and therefore the intermediate plateau 7d is essentially replaced by a shallow slope.

The invention claimed is:

1. A passive, current dependent inductivity comprising a magnetic core, windings and at least one bank air gap,
   wherein a saturation region made of magnetic material is arranged between the bank air gap and the windings,
   such that a magnetic flux path bifurcates into a first path passing through the saturation region and into a second path passing through the bank air gap and bypassing the saturation region,
   whereby the magnetic resistance of the first path is lower than the magnetic resistance of the second path for winding currents below a first saturation current and whereby the magnetic resistance of the second path is lower than the magnetic resistance of the first path for winding currents above the first saturation current due significant saturation effects occurring in the saturation region.

2. The current dependent inductivity according to claim 1, whereby the saturation region is made of a material with a sharp saturation behaviour.

3. The current dependent inductivity according to claim 1, whereby the saturation region is made of ferrite.

4. The current dependent inductivity according to claim 1, whereby all parts of the magnetic core which are not air gaps are made of the same material, preferably ferrite.

5. The current dependent inductivity according to claim 1, whereby the saturation region is adjacent to the windings.

6. The current dependent inductivity according to claim 1, whereby the bank air gap is completely surrounded by magnetic material.

7. The current dependent inductivity according to claim 1, whereby the bank air gap comprises regions of different thickness and whereby the bank air gap is preferably filled with two different non-magnetic materials, especially partially with air and partially with a solid non-magnetic material.

8. The current dependent inductivity according to claim 1, whereby all windings are wound around the same leg of the magnetic core.

9. The current dependent inductivity according to claim 1, whereby the bank air gap extends perpendicular to a longitudinal axis of the winding and crosses the longitudinal axis of the windings above or below the windings.

10. The current dependent inductivity according to claim 1, comprising a central air gap which is located on the leg of the magnetic core around which the windings are wound.

11. The current dependent inductivity according to claim 1 with a magnetic core comprising a central leg around which the windings are wound, a top part, a bottom part, a middle part and a lateral part,
    wherein the bottom part connects the lower end of the central leg with the lower end of the lateral part, and
    wherein the top part connects the upper end of the central leg with the upper end of the lateral part and
    wherein the middle part connects the central leg with the lateral part at a height between the bottom part and the top part such that it touches neither the bottom part nor the top part and
    such that the bottom part, the lateral part, the middle part and the central leg define one or more winding windows and
    wherein the bank air gap is arranged in the central leg at a height between the middle part and the top part and
    wherein the central leg, the top part, the bottom part, the middle part and the lateral part are made of the same material
    and wherein the smallest cross-sectional area of the bottom part is less or equal to the sum of the smallest cross-sectional area of the middle part and the smallest cross-sectional area of the top part
    and wherein the smallest cross-sectional area of the middle part is smaller than the smallest cross-sectional area of the bottom part
    such that the middle part comprises the saturation region.

12. The current dependent inductivity according to claim 11 comprising
    a first component which is a single piece containing the bottom part, a lower section of the lateral part and a lower section of the central leg,
    a second component which is a single piece containing the middle part, a middle section of the lateral part and a middle section of the central leg,
    a third component which is a single piece containing the top part, an upper section of the lateral part and an upper section of the central leg and
    a bank air gap component made of a material with a relative initial permeability at room temperature $\mu_r$ close to 1 to be arranged between the second component and the third component and
    preferably, a central air gap component made of a material with a relative initial permeability at room temperature $\mu_r$ close to 1 to be arranged between the first component and the second component wherein the first, second and third component are preferably made of ferrite.

13. The power converter comprising a choke comprising a passive, current dependent inductivity according to claim 1.

14. Method of constructing the passive, current dependent inductivity according to claim 1 comprising the steps of
    a) Choosing a value of the first saturation current, a value of a final saturation current and a value of an intermediate inductance plateau
    b) Choosing the smallest cross-sectional area and the material of the saturation region such that the saturation region saturates when a winding current with the value of the first saturation current flows, c) Choosing the thickness of the bank air gap such that the value of the inductance of the magnetic core equals the value of the chosen intermediate inductance plateau when a winding current with a value greater than the first saturation current but lower than the final saturation current flows,
d) Choosing the dimensions and the material of the magnetic core such that it saturates outside the saturation region when a winding current with the value of the final saturation current flows through the magnetic core.

\* \* \* \* \*